United States Patent
Liang et al.

(10) Patent No.: US 12,079,483 B2
(45) Date of Patent: Sep. 3, 2024

(54) METHOD FOR ACCESSING FLASH MEMORY MODULE, FLASH MEMORY CONTROLLER, AND MEMORY DEVICE

(71) Applicant: Silicon Motion, Inc., Hsinchu County (TW)

(72) Inventors: Chia-Chi Liang, Hsinchu County (TW); Hsiao-Chang Yen, Hsinchu County (TW); Tsu-Han Lu, Hsinchu (TW)

(73) Assignee: Silicon Motion, Inc., Hsinchu County (TW)

( * ) Notice: Subject to any disclaimer, the term of this patent is extended or adjusted under 35 U.S.C. 154(b) by 45 days.

(21) Appl. No.: 17/976,901

(22) Filed: Oct. 31, 2022

(65) Prior Publication Data

US 2024/0094915 A1 Mar. 21, 2024

(30) Foreign Application Priority Data

Sep. 19, 2022 (TW) ................................. 111135271

(51) Int. Cl.
*G06F 3/06* (2006.01)

(52) U.S. Cl.
CPC .......... *G06F 3/0613* (2013.01); *G06F 3/0629* (2013.01); *G06F 3/0679* (2013.01)

(58) Field of Classification Search
CPC ............. G06F 11/1072; G06F 11/1012; G06F 11/1048; G06F 2212/1032; G06F 3/064; G06F 3/0679; G06F 3/0604
See application file for complete search history.

(56) References Cited

U.S. PATENT DOCUMENTS

| 5,963,473 A | 10/1999 | Norman | |
|---|---|---|---|
| 2009/0070651 A1* | 3/2009 | Diggs | G06F 11/1068 |
| | | | 714/752 |
| 2013/0326313 A1 | 12/2013 | Khan | |
| 2014/0136927 A1* | 5/2014 | Li | G06F 11/1016 |
| | | | 714/768 |
| 2020/0042223 A1* | 2/2020 | Li | G11C 29/52 |
| 2021/0064249 A1* | 3/2021 | Mehta | G06F 11/1048 |

FOREIGN PATENT DOCUMENTS

| EP | 2 198 430 B1 | 6/2013 |
|---|---|---|
| TW | I447735 B | 8/2014 |

OTHER PUBLICATIONS

S.-H. Lim, J.-B. Lee, G.-M. Kim and W. H. Ahn, "A Stepwise Rate-Compatible LDPC and Parity Management in NAND Flash Memory-Based Storage Devices," in IEEE Access, vol. 8, pp. 162491-162506, 2020, doi: 10.1109/ACCESS.2020.3021498 (Year: 2020).*

\* cited by examiner

*Primary Examiner* — Curtis James Kortman
(74) *Attorney, Agent, or Firm* — Winston Hsu

(57) ABSTRACT

A method for accessing a flash memory module includes: selecting a block in the flash memory module; selecting a specific encoding/decoding setting from a plurality of sets of encoding/decoding settings at least according to an erase count of the block, wherein the plurality of sets of encoding/decoding settings include different error correction code (ECC) lengths, respectively; utilizing the specific encoding/decoding setting to encode a data to generate an encoded data; and writing the encoded data into the block.

10 Claims, 12 Drawing Sheets

| | Erase count of block | ECC length (byte) |
|---|---|---|
| First set of encoding/decoding settings | <100 | 306 |
| Second set of encoding/decoding settings | 100~200 | 342 |
| Third set of encoding/decoding settings | 200~300 | 378 |
| ⋮ | ⋮ | ⋮ |
| Eighth set of encoding/decoding settings | >700 | 630 |

| | Erase count of block | ECC length (byte) |
|---|---|---|
| First set of encoding/decoding settings | <100 | 306 |
| Second set of encoding/decoding settings | 100~200 | 342 |
| Third set of encoding/decoding settings | 200~300 | 378 |
| ... | ... | ... |
| Eighth set of encoding/decoding settings | >700 | 630 |

FIG. 3

| | Erase count of TLC block | Erase count of SLC block | ECC length (byte) |
|---|---|---|---|
| First set of encoding/decoding settings | - | <100 | 306 |
| Second set of encoding/decoding settings | <100 | 100~200 | 342 |
| Third set of encoding/decoding settings | 100~200 | 200~300 | 378 |
| ... | ... | ... | ... |
| Eighth set of encoding/decoding settings | >600 | >700 | 630 |

FIG. 5

| | Erase count of block | Amount of data | ECC length (byte) |
|---|---|---|---|
| First set of encoding/decoding settings | <100 | 4KB | 306 |
| Second set of encoding/decoding settings | 100~200 | 4KB | 342 |
| Third set of encoding/decoding settings | 200~300 | 4KB | 378 |
| ... | ... | ... | ... |
| Eighth set of encoding/decoding settings | >700 | 4KB | 630 |
| Ninth set of encoding/decoding settings | <200 | 2KB | 150 |
| Tenth set of encoding/decoding settings | >=200 | 2KB | 300 |

FIG. 10

METHOD FOR ACCESSING FLASH MEMORY MODULE, FLASH MEMORY CONTROLLER, AND MEMORY DEVICE

BACKGROUND OF THE INVENTION

1. Field of the Invention

The present invention is related to a flash memory, and more particularly, to a flash memory controller that can improve the access efficiency.

2. Description of the Prior Art

With the development of low-density parity-check codes (LDPCs), an encoder in a flash memory controller can encode data to generate an error correction code (ECC) with more bits, wherein the ECC and the data will be written into a flash memory module. When the flash memory controller needs to read data from the flash memory module, a decoder can utilize the ECC with more bits to perform error correction upon data with a higher bit error amount/bit error rate, which is more likely to result in successful decoding of the data. Although the use of LDPCs improves the decoding capability of ECC circuits, due to the increase in the ECC length (i.e. the number of bits), the amount of data that the flash memory controller needs to read also increases, which causes the read speed to drop.

Encoded data generated by the encoder is referred to as a chunk, wherein a chunk includes data and a corresponding ECC, and the size of each chunk is fixed (e.g. each chunk includes 4 kilobytes (KB) of data and 450 bytes (B) of ECC). In the flash memory controller operations, many data tables (e.g. logical address to physical address mapping tables) are frequently written into the flash memory module, wherein the size of the data tables may be smaller than 4 KB (e.g. 1 KB or 2 KB). For a traditional encoder that outputs fixed-size chunks, this may result in low encoding efficiency. In addition, since the decoder also needs to read entire chunks for decoding, the decoding efficiency of the decoder for these data tables is also not good.

SUMMARY OF THE INVENTION

It is therefore one of the objectives of the present invention to provide a flash memory controller that can improve the access efficiency, to address the above-mentioned issues.

According to an embodiment of the present invention, a method for accessing a flash memory module is provided. The method comprises: selecting a block in the flash memory module; selecting a specific encoding/decoding setting from a plurality of sets of encoding/decoding settings at least according to an erase count of the block, wherein the plurality of sets of encoding/decoding settings comprise different error correction code (ECC) lengths, respectively; utilizing the specific encoding/decoding setting to encode a data to generate an encoded data; and writing the encoded data into the block.

According to an embodiment of the present invention, a flash memory controller is provided. The flash memory controller comprises a read only memory, a microprocessor, an encoder, and a decoder. The read only memory is arranged to store a program code. The microprocessor is arranged to execute the program code to control access of the flash memory module. The microprocessor selects a block in the flash memory module, and selects a specific encoding/decoding setting from a plurality of sets of encoding/decoding settings at least according to an erase count of the block, wherein the plurality of sets of encoding/decoding settings comprise different error correction code (ECC) lengths, respectively; and the encoder utilizes the specific encoding/decoding setting to encode a data to generate an encoded data, and writes the encoded data into the block.

According to an embodiment of the present invention, a memory device is provided. The memory device comprises a flash memory module and a flash memory controller. The flash memory controller is arranged to access the flash memory module, and is further arranged to: select a block in the flash memory module; select a specific encoding/decoding setting from a plurality of sets of encoding/decoding settings at least according to an erase count of the block, wherein the plurality of sets of encoding/decoding settings comprise different error correction code (ECC) lengths, respectively; utilize the specific encoding/decoding setting to encode a data to generate an encoded data; and write the encoded data into the block.

One of the benefits of the method for accessing a flash memory module of the present invention is that, after the encoder is set according to the type of data to be written and/or the erase count and type of the block that needs to be written, an encoded data with a suitable size can be generated. This means the subsequent reading of data from the flash memory module can be faster, which improves the overall efficiency of the memory device.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a diagram illustrating a plurality of sets of encoding/decoding settings according to an embodiment of the present invention.

FIG. 5 is a diagram illustrating a plurality of sets of encoding/decoding settings according to an embodiment of the present invention.

FIG. 10 is a diagram illustrating a plurality of sets of encoding/decoding settings according to an embodiment of the present invention.

DETAILED DESCRIPTION

Figure 1:
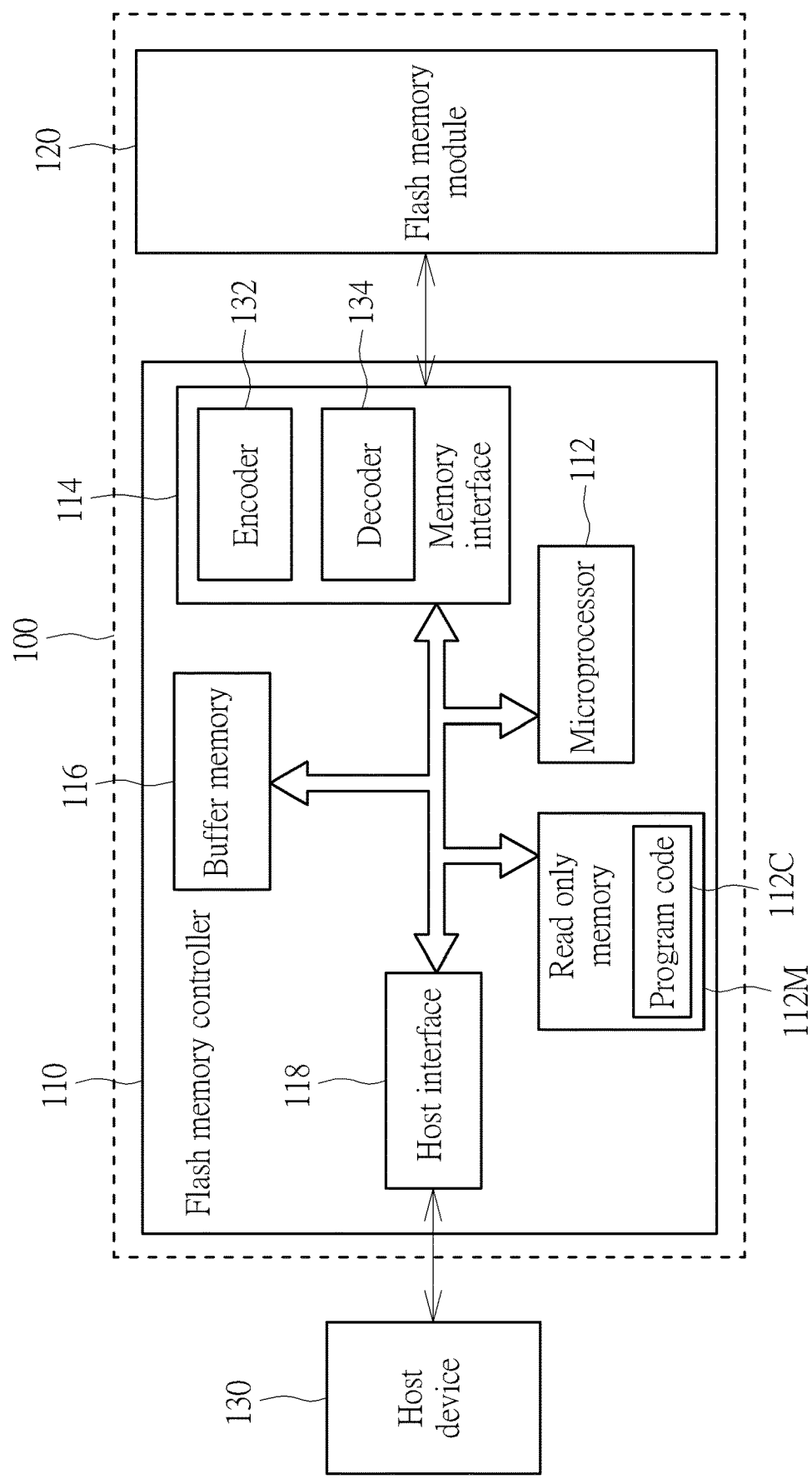
FIG. 1 is a diagram illustrating a memory device according to an embodiment of the present invention.

FIG. 1 is a diagram illustrating a memory device 100 according to an embodiment of the present invention. The memory device 100 may include a flash memory controller 110 and a flash memory module 120, and the flash memory controller 110 is arranged to access the flash memory module 120. In this embodiment, the flash memory controller 110 may include a microprocessor 112, a read only memory 112M, a memory interface 114, a buffer memory 116, and a host interface 118. The read only memory 112M may be arranged to store a program code 112C, and the microprocessor 112 may be arranged to execute the program code 112C to control access of the flash memory module 120. The memory interface 114 may include an encoder 132 and a decoder 134, wherein the encoder 132 may be arranged to encode data that is written into the flash memory module 120, to generate a corresponding parity (also known as an error correction code (ECC)), and the decoder 134 is arranged to decode data that is read from the flash memory module 120.

The flash memory module 120 may include a plurality of flash memory chips, and each flash memory chip includes a plurality of blocks. A controller (e.g. the flash memory controller 110 that executes the program code 112C through the microprocessor 112) may copy, erase, and merge data for the flash memory module 120 with a block as a unit. In addition, a block can record a specific number of pages, wherein the controller (e.g. the flash memory controller 110 that executes the program code 112C through the microprocessor 112) may perform a data write operation upon the flash memory module 120 with a page as a unit. In other words, a block is the smallest erase unit in the flash memory module 120, and a page is the smallest write unit in the flash memory module 120.

In practice, the flash memory controller 110 that executes the program code 112C through the microprocessor 112 may utilize its own internal components to perform many control operations. For example, the flash memory controller 122 utilizes the memory interface 114 to control access of the flash memory module 120 (especially access of at least one block or at least one page), utilizes the buffer memory 116 to perform a required buffering operation, and utilizes the host interface 118 to communicate with a host device 130.

In one embodiment, the memory device 100 may be a portable memory device such as a memory card which conforms to one of the SD/MMC, CF, MS and XD specifications, and the host device 130 is an electronic device able to be connected to the memory device 100, such as a cellphone, a laptop, a desktop computer, etc. In another embodiment, the memory device 100 can be a solid state drive (SSD) or an embedded device with embedded multimedia card (EMMC) specification, and can be arranged in an electronic device, such as a cellphone, a laptop or a desktop computer. At this time, the host device 130 can be a processor of the electronic device.

Figure 2:
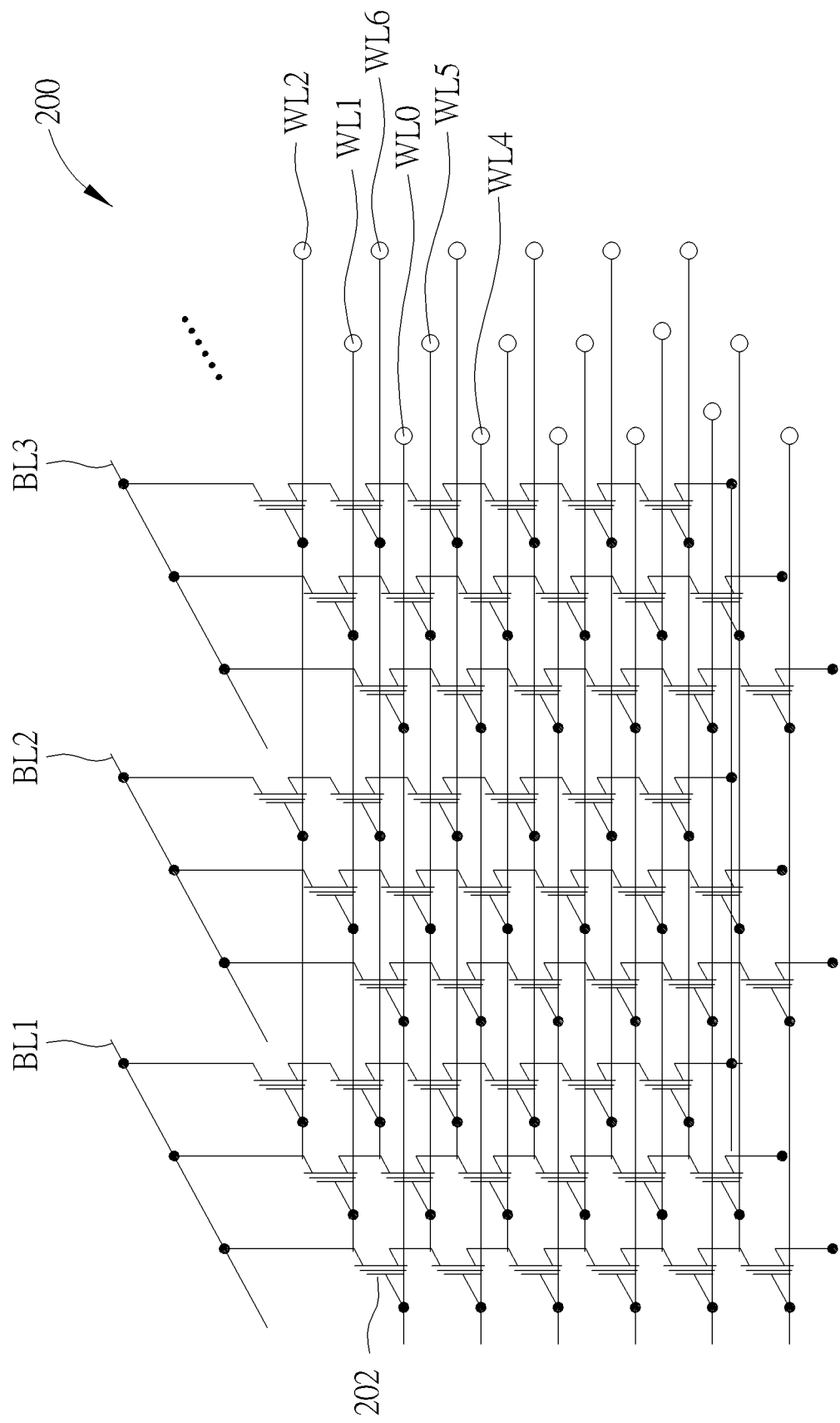
FIG. 2 is a diagram illustrating a block in a flash memory controller according to an embodiment of the present invention.

FIG. 2 is a diagram illustrating a block 200 in the flash memory module 120 according to an embodiment of the present invention, wherein the flash memory module 120 is a 3D NAND-type flash memory module. As shown in FIG. 2, the block 200 includes a plurality of memory cells, such as floating gate transistors 202 shown in FIG. 2 or other charge trapping components. A 3D NAND-type flash memory structure is formed through a plurality of bit lines (only BL1-BL3 are shown in FIG. 2) and a plurality of word lines (e.g. WL0-WL2 and WL4-WL6 shown in FIG. 2). Taking a top plane in FIG. 2 as an example, all floating gate transistors on the word line WL0 form at least one page, all floating gate transistors on the word line WL1 form at least another page, all floating gate transistors on the word line WL2 form at least yet another page, and so on. In addition, the definition between the word line WL0 and the page (e.g. a logic page) may vary depending on a writing method of the flash memory. In detail, when data are stored using a single-level cell (SLC) method, all floating gate transistors on the word line WL0 correspond to only one logic page; when data are stored using a multi-level cell (MLC) method, all floating gate transistors on the word line WL0 correspond to two logic pages; when data are stored using a triple-level cell (TLC) method, all floating gate transistors on the word line WL0 correspond to three logic pages; and when data are stored using a quad-level cell (QLC) method, all floating gate transistors on the word line WL0 correspond to four logic pages. The 3D NAND-type flash memory structure and the relationship between word lines and pages should be well-known to those skilled in the art, and no further illustration is provided.

In this embodiment, in order to make the flash memory controller 100 have better read efficiency when reading the flash memory module 120, the encoder 132 is configured with various encoding settings to generate error correction codes (ECCs) with different numbers of bits. The decoder 134 may also be configured with various decoding settings to decode chunks with different numbers of bits, wherein each chunk includes a data and a corresponding ECC. Refer to FIG. 3, which is a diagram illustrating a plurality of sets of encoding/decoding settings according to an embodiment of the present invention. In this embodiment, the encoder 132 and the decoder 134 have various encoding/decoding settings (e.g. 8 sets of encoding/decoding settings), and each encoding/decoding setting corresponds to different program/erase counts of the block (hereinafter referred to as the erase count of the block for brevity) and different ECC lengths. For example, when the erase count of the block that needs to be written or read is less than "100", the encoder 132 or the decoder 134 will have a first set of encoding/decoding settings. At this moment, the encoder 132 is arranged to encode the data to generate the encoded data with 306 bytes ECC, or the decoder 134 may decode the chunk with 306 bytes ECC. When the erase count of the block that needs to be written or read is between "100"-"200", the encoder 132 or the decoder 134 will have a second set of encoding/decoding settings. At this moment, the encoder 132 is arranged to encode the data to generate the encoded data with 342 bytes ECC, or the decoder 134 may decode the chunk with 342 bytes ECC. When the erase count of the block that needs to be written or read is greater than "700", the encoder 132 or the decoder 134 will have an eighth set of encoding/decoding settings. At this moment, the encoder 132 is arranged to encode the data to generate the encoded data with 630 bytes ECC, or the decoder 134 may decode the chunk with 630 bytes ECC.

It should be noted that the number of sets of encoding/decoding settings, the range of erase count of the block, and the ECC length shown in FIG. 3 are for illustration only, and the present invention is not limited thereto. In practice, the number of sets of encoding/decoding settings, the range of the erase count of the block, and the ECC length can be determined by the designer through simulation or measurement to determine the most suitable values, and these design changes should belong to the scope of the present invention.

Figure 4:
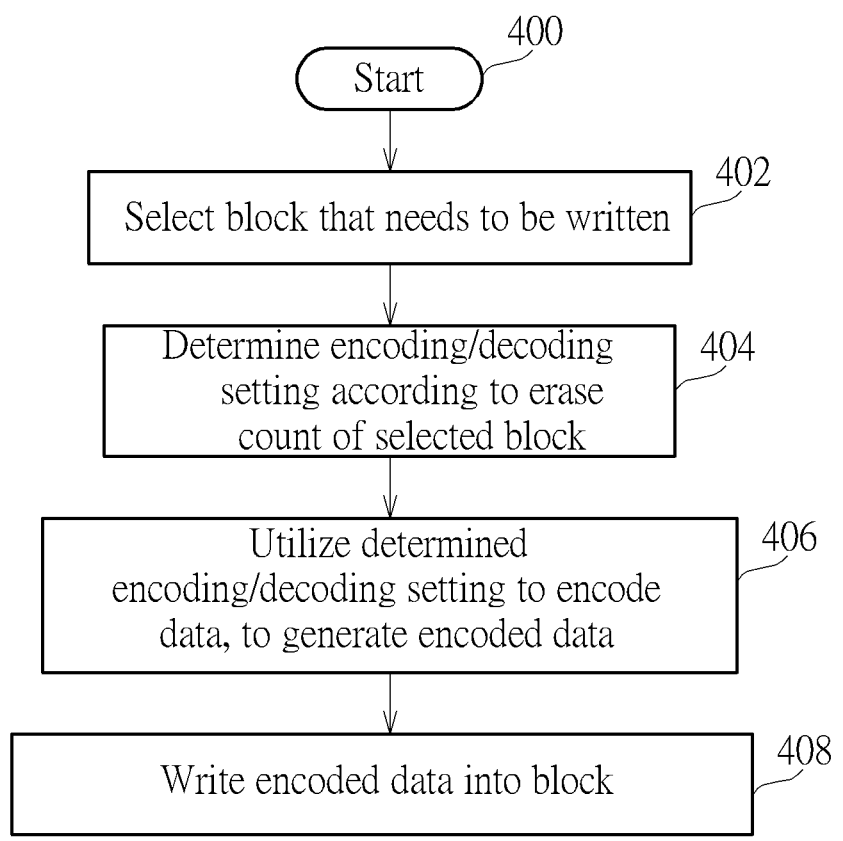
FIG. 4 is a flow chart of writing data into the flash memory module according to an embodiment of the present invention.

FIG. 4 is a flow chart of writing data into the flash memory module 120 according to an embodiment of the present invention.

In Step 400, the flow starts, and the memory device 100 is powered on and an initialization operation is completed.

In Step 402, the microprocessor 112 in the flash memory controller 100 selects a block from the flash memory module 120 for data writing according to a write command from the host device 130 or the data temporarily stored in the buffer memory 116.

In Step 404, the microprocessor 112 determines an encoding/decoding setting according to the erase count of the selected block. Specifically, since the flash memory controller 110 will continuously record the usage status of each block, and integrate the erase count of each block into a block erase count data table which is then stored in the flash memory module 120, the microprocessor 112 can directly refer to the block erase count data table to obtain the erase count of the selected block, and determine the appropriate encoding/decoding setting. Take FIG. 3 as an example. In response to the erase count of the selected block being smaller than "100", the microprocessor 112 determines to utilize the first set of encoding/decoding settings to set the encoder 132. In response to the erase count of the selected block being between "100"-"200", the microprocessor 112 determines to utilize the second set of encoding/decoding settings to set the encoder 132.

In Step 406, the encoder 132 encodes that data according to the encoding/decoding setting determined by the microprocessor 112, to generate an encoded data, wherein in response to the encoder 132 having the first set of encoding/decoding settings, the encoded data that is generated by encoding 4 KB data through the encoder 132 includes 4 KB data and 306 bytes ECC; and in response to the encoder 132 having the second set of encoding/decoding settings, the encoded data that is generated by encoding 4 KB data through the encoder 132 includes 4 KB data and 342 bytes ECC.

In Step 408, the flash memory controller 110 writes the encoded data into the block in the flash memory module 120 selected in Step 402.

In the above embodiments, when the erase count of the block is small, the block will have better storage quality and the probability of errors in the stored data will be lower. As a result, the microprocessor 112 can generate an ECC with a lower number of bits by setting the encoder 132, wherein the ECC may have a poor error correction capability, but is sufficient to correct errors generated by the block. In addition, since the encoded data written into the block has a small amount of data, the subsequent reading of the encoded data can have a faster speed. When the erase count of the block is large, the block will have poor storage quality and the probability of errors in the stored data will be higher. As a result, the microprocessor 112 can generate an ECC with a higher number of bits by setting the encoder 132, wherein the ECC may have a strong error correction capability, to ensure that the error content can be corrected when the encoded data is read. As described above, by generating an ECC with an appropriate length and an appropriate correction capability according to the storage quality of the block, the encoder 132 can avoid generating an ECC with too many bits for a block with better storage quality, which effectively improves the access efficiency.

In the embodiments shown in FIG. 3 and FIG. 4, the microprocessor 112 determines the encoding/decoding setting used by the encoder 132 according to the erase count of the selected block. In some embodiments, in Step 404, the microprocessor 112 will determine the encoding/decoding setting used by the encoder 132 according to the type and the erase count of the selected block at the same time, wherein the type of the block is one of the SLC block (i.e. each memory cell will store only one bit), the MLC block (i.e. each memory cell will store two bits), the TLC block (i.e. each memory cell will store three bits), and the QLC block (i.e. each memory cell will store four bits). Refer to FIG. 5, which is a diagram illustrating a plurality of sets of encoding/decoding settings according to an embodiment of the present invention. In this embodiment, the encoder 132 and the decoder 134 have various encoding/decoding settings (e.g. 8 sets of encoding/decoding settings), and each encoding/decoding setting corresponds to different program/erase counts of the block (hereinafter referred to as the erase count of the block for brevity) and different ECC lengths. For example, when the erase count of an SLC block that needs to be written or read is less than "100", the encoder 132 or the decoder 134 will have a first set of encoding/decoding settings. At this moment, the encoder 132 is arranged to encode the data to generate the encoded data with 306 bytes ECC, or the decoder 134 may decode the chunk with 306 bytes ECC. When the erase count of an SLC block that needs to be written or read is between "100"-"200", the encoder 132 or the decoder 134 will have a second set of encoding/decoding settings. At this moment, the encoder 132 is arranged to encode the data to generate the encoded data with 342 bytes ECC, or the decoder 134 may decode the chunk with 342 bytes ECC. When the erase count of an SLC block that needs to be written or read is between "200"-"300" or the erase count of a TLC block that needs to be written or read is between "100"-"200", the encoder 132 or the decoder 134 will have a third set of encoding/decoding settings. At this moment, the encoder 132 is arranged to encode the data to generate the encoded data with 378 bytes ECC, or the decoder 134 may decode the chunk with 378 bytes ECC. When the erase count of an SLC block that needs to be written or read is greater than "700" or the erase count of a TLC block that needs to be written or read is greater than "600", the encoder 132 or the decoder 134 will have an eighth set of encoding/decoding settings. At this moment, the encoder 132 is arranged to encode the data to generate the encoded data with 630 bytes ECC, or the decoder 134 may decode the chunk with 630 bytes ECC.

It should be noted that the number of sets of encoding/decoding settings, the type of the block, the range of erase count of the block, and the ECC length shown in FIG. 5 are for illustration only, and the present invention is not limited thereto. In practice, the number of sets of encoding/decoding settings, the type of the block, the range of the erase count of the block, and the ECC length can be determined as the most suitable values by the designer through simulation or measurement, and these design changes should belong to the scope of the present invention.

Figure 6:
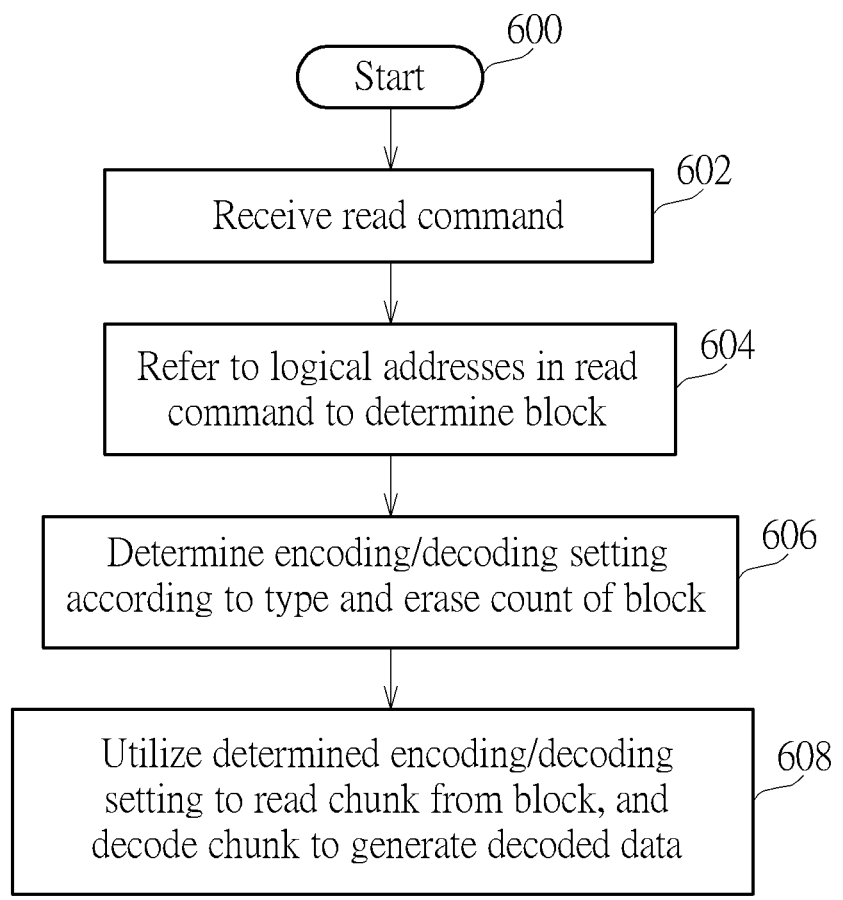
FIG. 6 is a flow chart of reading data from the flash memory module according to an embodiment of the present invention.

FIG. 6 is a flow chart of reading data from the flash memory module 120 according to an embodiment of the present invention.

In Step 600, the flow starts, and the memory device 100 is powered on and an initialization operation is completed.

In Step 602, the flash memory controller 110 receives a read command, wherein the read command requires reading a data with a specific logical address.

In Step 604, the microprocessor 112 determines in which of the block the data with the specific logical address is stored according to a logical to physical address mapping table.

In Step 606, the microprocessor 112 determines an encoding/decoding setting according to the erase count of the block that is determined in Step 604, or determines an encoding/decoding setting according to the type and the erase count of the block that is determined in Step 604, wherein the method for determining the encoding/decoding setting is described in Step 404 shown in FIG. 4 and the embodiments shown in FIG. 3 and FIG. 5.

In Step 608, the decoder 134 decodes a chunk read from the block according to the encoding/decoding setting determined by the microprocessor 112 to generate a decoded data, wherein the content included in the chunk is the encoded data written into the flash memory module 120 shown in Step 408 of FIG. 4. For example, if the decoder 134 has the first set of encoding/decoding settings and the read block is an SLC block, the decoder 134 reads a chunk with 4 KB data and 306 bytes ECC from the SLC block for decoding. If the decoder 134 has the second set of encoding/decoding settings and the read block is an SLC block, the decoder 134 reads a chunk with 4 KB data and 342 bytes ECC from the SLC block for decoding.

In the above embodiments, for each write command or read command, the microprocessor 112 needs to determine the encoding/decoding setting that is required to be utilized by the encoder 132 or the decoder 134; however, the present invention is mot limited thereto. In other embodiments, the microprocessor 112 can directly refer to the highest erase count among the erase counts recorded in the above-mentioned block erase count data table (i.e. the highest erase count among the erase counts of all blocks) for determining the encoding/decoding setting required to be subsequently utilized by the encoder 132 or the decoder 134. Take FIG. 3 as an example. In FIG. 3, if the highest erase count among the erase counts recorded in the block erase count data table is less than "100", the microprocessor 112 directly sets the encoder 132 or the decoder 134 to be equipped with the first set of encoding/decoding settings, and for subsequent data writing and data reading, there is no need to determine an appropriate encoding/decoding setting again until the highest erase count among the erase counts recorded in the block erase count data table changes or is higher than "100". If the highest erase count among the erase counts recorded in the block erase count data table is between "200"-"300", the microprocessor 112 directly sets the encoder 132 or the decoder 134 to be equipped with the third set of encoding/decoding settings, and for subsequent data writing and data reading, there is no need to determine an appropriate encoding/decoding setting again until the highest erase count among the erase counts recorded in the block erase count data table changes or is higher than "300". The above-mentioned embodiments can avoid the need for the microprocessor 112 to determine the encoding/decoding setting that is required to be utilized by the encoder 132 or the decoder 134 for each write/read command, which improves the processing efficiency.

In one embodiment, the memory device 100 does not have a dynamic random access memory (DRAM). As a result, various data tables required to perform operations by the flash memory controller 100 are temporarily stored in the buffer memory 116. Since the capacity of the buffer memory 116 is limited, the microprocessor 112 temporarily stores the data table that is not needed in the flash memory module 120, and then loads it from the flash memory module 120 to the buffer memory 116 when it needs to be used. Take a logical to physical address mapping table (hereinafter referred to as an L2P mapping table) as an example. The memory controller 110 may include multiple L2P mapping tables, wherein each L2P mapping table includes a segment of consecutive logical addresses and corresponding physical addresses; when the microprocessor 112 receives a write command, the microprocessor 112 will determine whether a corresponding L2P mapping table is within the buffer memory 116 according to the logical addresses included in the write command. If the corresponding L2P mapping table is not within the buffer memory 116, the microprocessor 112 will read the corresponding L2P mapping table from the flash memory module 120, and update the corresponding L2P mapping table after the data of the write command is written into the flash memory module 120.

In addition, when the microprocessor 112 receives a read command, the microprocessor 112 will determine whether a corresponding L2P mapping table is within the buffer memory 116 according to the logical addresses included in the read command. If the corresponding L2P mapping table is not within the buffer memory 116, the microprocessor 112 will read the corresponding L2P mapping table from the flash memory module 120, and search for the physical addresses corresponding to the logical addresses included in the read command from the corresponding L2P mapping table for data reading. In general, the data processed by the flash memory controller 110 has a fixed size (e.g. 4 KB), i.e. the size of each logical block address (LBA) of the write command provided by the host device 130 is 4 KB, and the sizes of the L2P mapping table and other data tables are not too large, such as 1 KB or 2 KB. As a result, if the encoder 132 is still designed to encode 4 KB data, the encoded data will include lots of redundant data, which will reduce the efficiency of the encoder 132. To solve this issue, in this embodiment, the flash memory module 120 includes a first set of blocks and a second set of blocks arranged to store the data table and other data, respectively, wherein the first set of blocks and the second set of blocks utilize different chunk sizes.

Figure 7:
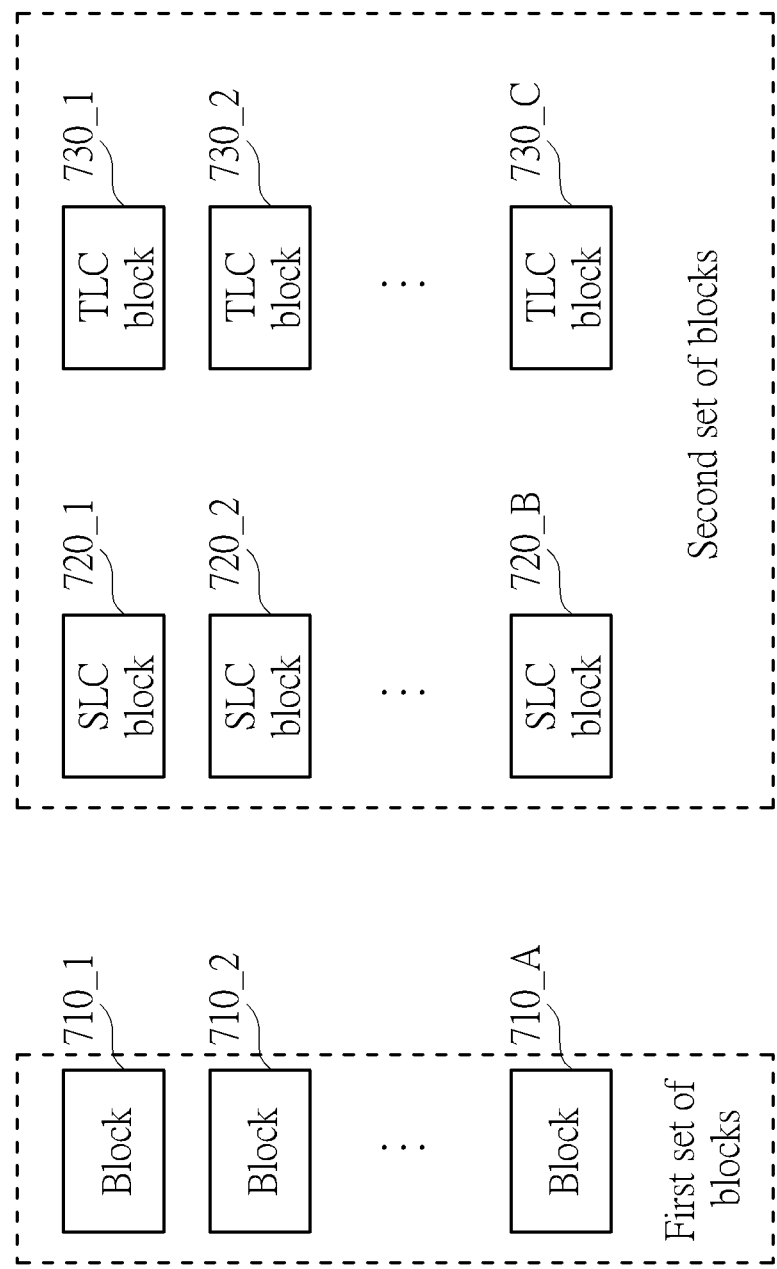
FIG. 7 is a diagram illustrating the flash memory module divided into a first set of blocks and a second set of blocks according to an embodiment of the present invention.

Refer to FIG. 7, which is a diagram illustrating the flash memory module 120 divided into a first set of blocks and a second set of blocks according to an embodiment of the present invention. As shown in FIG. 7, the flash memory 120 includes a first set of blocks and a second set of blocks, wherein the first set of blocks includes blocks 710_1-710_A, the blocks 710_1-710_A are arranged to store system data such as the above-mentioned L2P mapping table, the second set of blocks includes SLC blocks 720_1-720_B and TLC blocks 730_1-730_C, and the second set of blocks is arranged to store general data.

Figure 8:
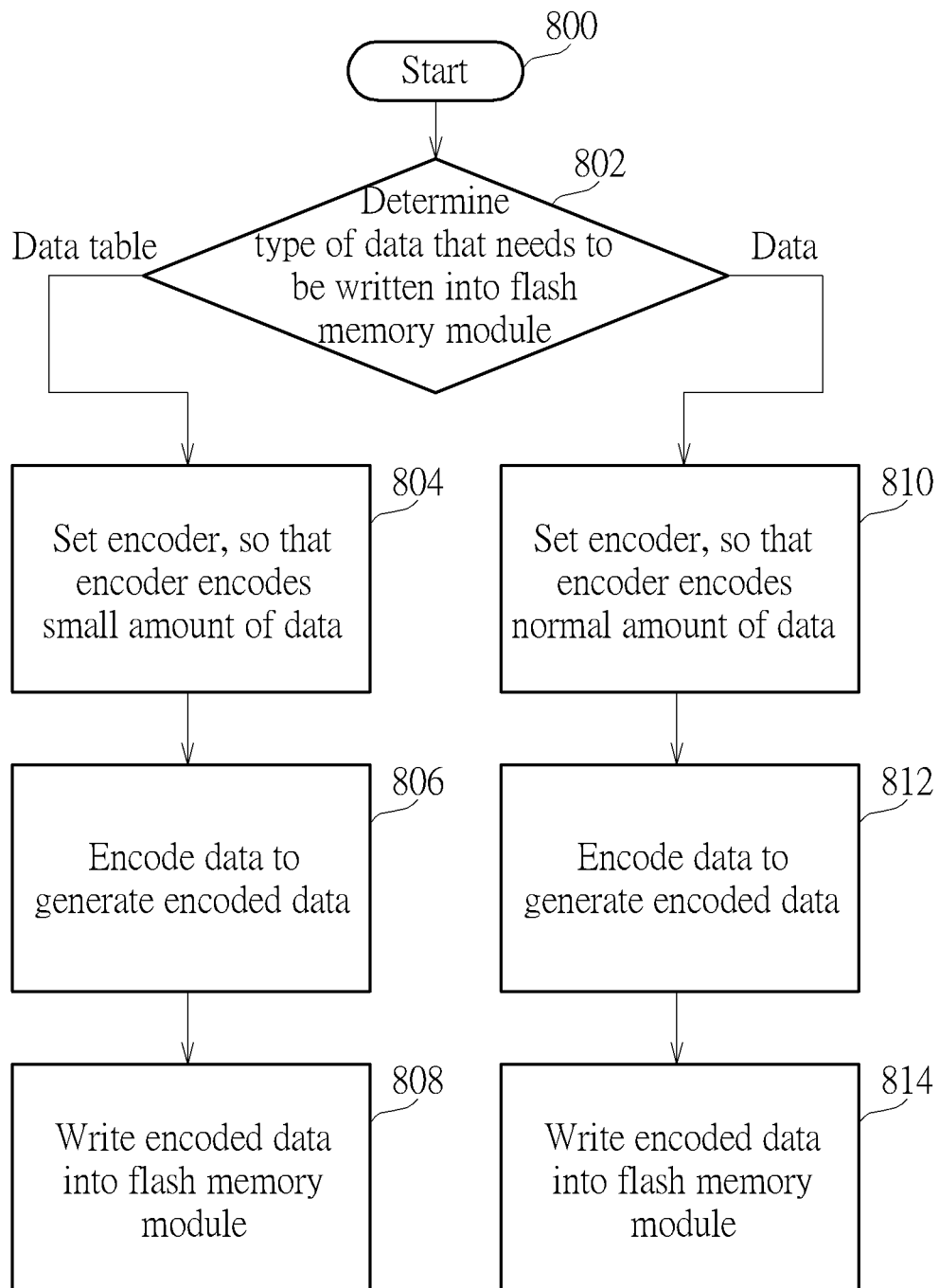
FIG. 8 is a flow chart of writing data into the flash memory module according to an embodiment of the present invention.

FIG. 8 is a flow chart of writing data into the flash memory module 120 according to an embodiment of the present invention.

In Step 800, the flow starts, and the memory device 100 is powered on and an initialization operation is completed.

In Step 802, the microprocessor 112 in the flash memory controller 110 determines the type of the data that is needed to be written into the flash memory module 120. If the data that is needed to be written into the flash memory module 120 is the data table temporarily stored in the buffer memory 116, Step 804 is entered. If the data that is needed to be written into the flash memory module 120 is the generated data from the host device 130 or the valid data moved by the memory device 100 during a garbage collection operation, Step 810 is entered.

In Step 804, the microprocessor 112 utilizes a first setting to set the encoder 132, so that the encoder 132 can encode a small amount of data (e.g. 2 KB).

In Step 806, the encoder 132 encodes the data to generate an encoded data, wherein the size of the encoded data is 2 KB plus the number of bits of ECC.

In Step 808, the flash memory controller 110 writes the encoded data into one of the blocks 710_1-710_A.

In Step 810, the microprocessor 112 utilizes a second setting to set the encoder 132, so that the encoder 132 can encode a normal amount of data (e.g. 4 KB).

In Step 812, the encoder 132 encodes the data to generate an encoded data, wherein the size of the encoded data is 4 KB plus the number of bits of ECC.

In Step 814, the flash memory controller 110 writes the encoded data into one of blocks 720_1-720_B and 730_1-730_C.

As mentioned above, through the technical contents of the embodiments in FIG. 7 and FIG. 8, the microprocessor 112 can set the amount of data processed by the encoder 132 and the size of the encoded data to be output according to the type of data to be written. In this way, a situation where the encoder 132 still outputs encoded data with a size of 4 KB when processing the data table with an actual effective size of 2 KB can be avoided, which can efficiently improve the efficiency of the encoder 132.

Figure 9:
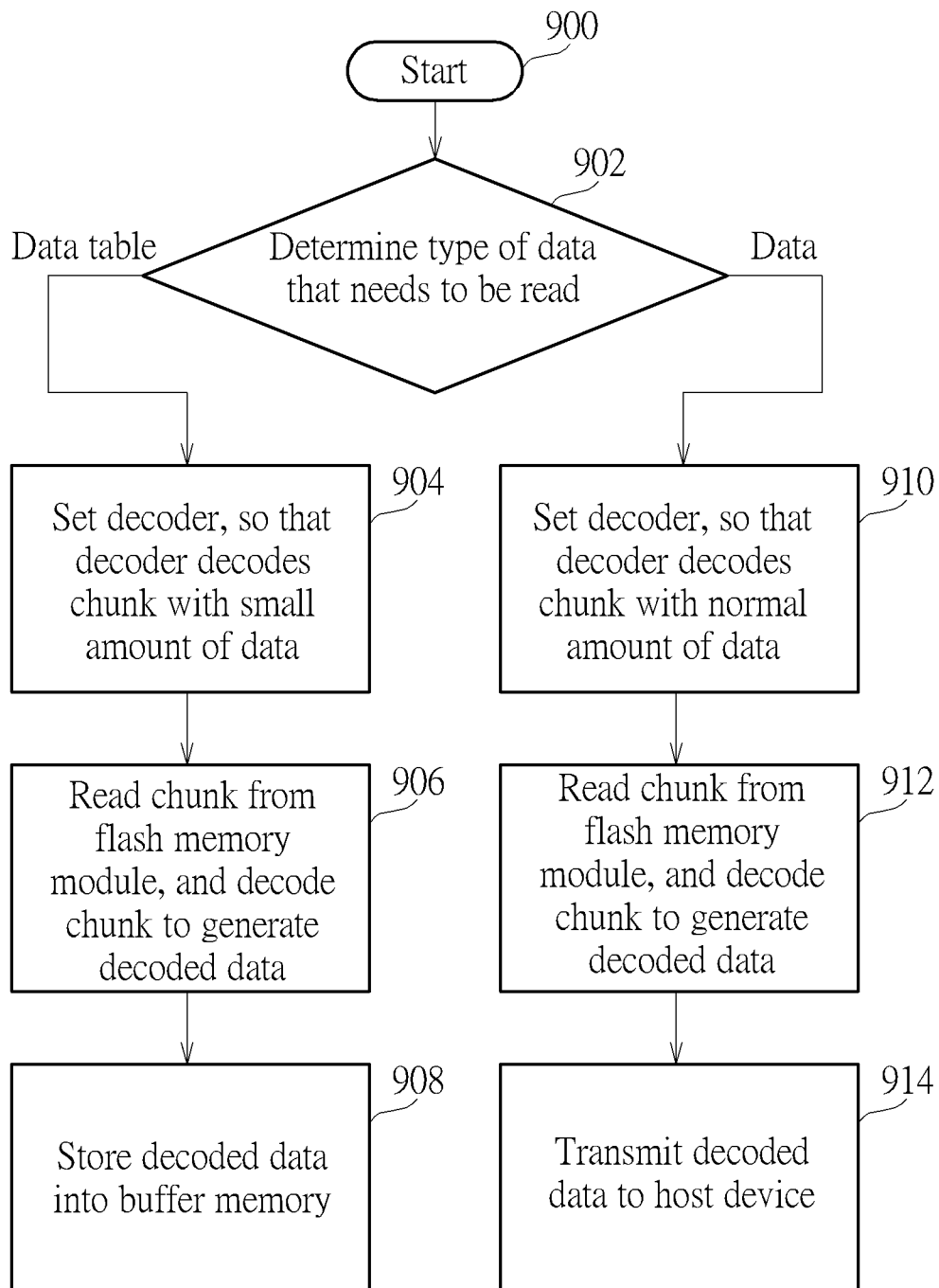
FIG. 9 is a flow chart of reading data from the flash memory module according to an embodiment of the present invention.

FIG. 9 is a flow chart of reading data from the flash memory module 120 according to an embodiment of the present invention.

In Step 900, the flow starts, and the memory device 100 is powered on and an initialization operation is completed.

In Step 902, the microprocessor 112 in the flash memory controller 110 determines the type of the data that is needed to be written into the flash memory module 120. If the data that is needed to be written into the flash memory module 120 is the data table within the blocks 710_1-710_A in the flash memory module 120, Step 904 is entered. If the data that is needed to be written into the flash memory module 120 is the general data within the blocks 720_1-720_B and 730_1-730_C in the flash memory module 120, Step 910 is entered.

In Step 904, the microprocessor 112 utilizes a first setting to set the decoder 134, so that the decoder 134 can decode a small amount of data (e.g. 2 KB).

In Step 906, the decoder 134 reads a chunk from the blocks 710_1-710_A according to the first setting, and decodes the chunk to generate a decoded data, wherein the size of the chunk may be the size of the encoded data in Step 806 shown in FIG. 8 (i.e. 2 KB plus the number of bits of ECC).

In Step 908, the decoder 134 stores the decoded data into the buffer memory 116.

In Step 910, the microprocessor 112 utilizes a second setting to set the decoder 134, so that the decoder 134 can decode a normal amount of data (e.g. 4 KB).

In Step 912, the decoder 134 reads a chunk from the blocks 720_1-720_B and 730_1-730_C according to the second setting, and decodes the chunk to generate a decoded data, wherein the size of the chunk may be the size of the encoded data in Step 812 shown in FIG. 8 (i.e. 4 KB plus the number of bits of ECC).

In Step 914, the decoder 134 stores the decoded data into the buffer memory 116, or the microprocessor 112 transmits the decoded data to the host device 130.

In the embodiments shown in FIG. 8 and FIG. 9, the first setting or the second setting of the encoder 132 and the decoder 134 is set by the microprocessor 112 (e.g. the microprocessor 112 modifies values of one or more registers in the encoder 132 and the decoder 134), so that the encoder 132 and the decoder 134 have different settings. In some embodiments, however, under a condition that the microprocessor 112 may continuously receive a large number of write commands or read commands and the write commands or read commands may not be executed sequentially, the microprocessor 112 can embed the above settings in the write commands transmitted to the encoder 132, and can also embed the above settings in the read commands sent to the decoder 134, to prevent the encoder 132 and the decoder 134 from utilizing incorrect settings for encoding and decoding.

In the embodiments shown in FIG. 3 and FIG. 4, the microprocessor 112 determines the encoding/decoding setting to be utilized according to the block type and/or the erase count, so that the encoder 132 can generate an ECC with a suitable size. In the embodiment shown in FIG. 8, the microprocessor 112 determines the amount of data received and processed by the encoder 132 according to the type of data required to be written into the flash memory module 120. In another embodiment of the present invention, the embodiments shown in FIG. 3, FIG. 4, and FIG. 8 can be combined so that the microprocessor 112 can set the encoder 132 to process the data with different sizes, and can also generate the ECC with the suitable size.

Refer to FIG. 10, which is a diagram illustrating a plurality of sets of encoding/decoding settings according to an embodiment of the present invention. As shown in FIG. 10, the encoder 132 and the decoder 134 have various encoding/decoding settings (e.g. 10 sets of encoding/decoding settings), and each encoding/decoding setting corresponds to different program/erase counts of the block (hereinafter referred to as the erase count of the block for brevity), different amounts of data, and different ECC lengths. For example, when the erase count of the blocks that needs to be written or read is less than "100" and the amount of data that needs to be written or read is 4 KB, the encoder 132 or the decoder 134 will have a first set of encoding/decoding settings. At this moment, the encoder 132 is arranged to encode 4 KB data to generate an encoded data that includes 306 bytes ECC, or the decoder 134 can decode a chunk that includes 4 KB data and 306 bytes ECC. When the erase count of the blocks that needs to be written or read is greater than "700" and the amount of data that needs to be written or read is 4 KB, the encoder 132 or the decoder 134 will have an eighth set of encoding/decoding settings. As this moment, the encoder 132 is arranged to encode 4 KB data to generate an encoded data that includes 630 bytes ECC, or the decoder 134 can decode a chunk that includes 4 KB data and 630 bytes ECC. When the erase count of the blocks that needs to be written or read is less than "200" and the amount of data that needs to be written or read is 2 KB, the encoder 132 or the decoder 134 will have a ninth set of encoding/decoding settings. As this moment, the encoder 132 is arranged to encode 2 KB data to generate an encoded data that includes 150 bytes ECC, or the decoder 134 can decode a chunk that includes 2 KB data and 150 bytes ECC. When the erase count of the blocks that needs to be written or read is greater than or equal to "200" and the amount of data that needs to be written or read is 2 KB, the encoder 132 or the decoder 134 will have a tenth set of encoding/decoding settings. As this moment, the encoder 132 is arranged to encode 2 KB data to generate an encoded data that includes 300 bytes ECC, or the decoder 134 can decode a chunk that includes 2 KB data and 300 bytes ECC.

It should be noted that the number of sets of encoding/decoding settings, the range of erase count of the block, the size of the amount of data, and the ECC length shown in FIG. 10 are for illustration only, and the present invention is not limited thereto. In practice, the number of sets of encoding/decoding settings, the range of the erase count of the block, the size of the amount of data, and the ECC length can be determined as the most suitable values by the designer through simulation or measurement, and these design changes should belong to the scope of the present invention.

Figure 11:
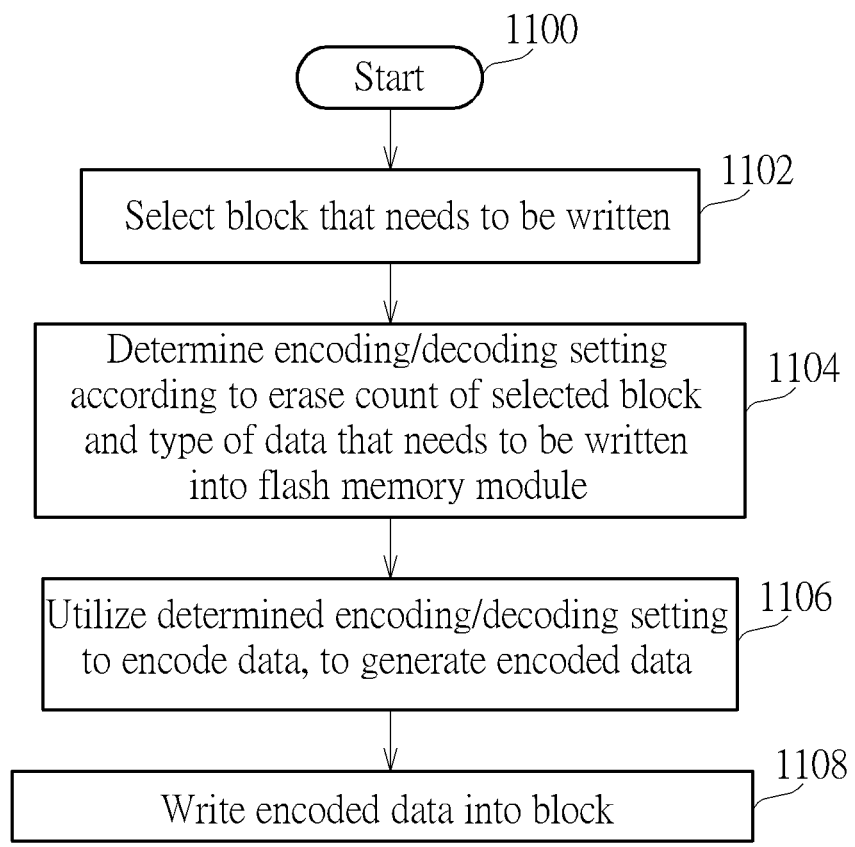
FIG. 11 is a flow chart of writing data into the flash memory module according to an embodiment of the present invention.

FIG. 11 is a flow chart of writing data into the flash memory module 120 according to an embodiment of the present invention.

In Step 1100, the flow starts, and the memory device 100 is powered on and an initialization operation is completed.

In Step 1102, the microprocessor 112 in the flash memory controller 110 selects a block from the flash memory module 120 for data writing according to a write command from the host device 130 or the data that needs to be temporarily stored in the buffer memory 116.

In Step 1104, the microprocessor 112 determines an encoding/decoding setting according to the erase count of the selected block and the type of the data that needs to be written into the flash memory module 120 (e.g. the 2 KB data table or the 4 KB general data). In another embodiment, the microprocessor 112 determines an encoding/decoding setting according to the erase count of the selected block, the type of the data that needs to be written into the flash memory module 120 (e.g. the 2 KB data table or the 4 KB general data), and the type of the selected block (e.g. the SLC block or the TLC block). Take FIG. 10 as an example. If the erase count of the selected block is less than "200" and the data that needs to be written is the 2 KB data table, the microprocessor 112 determines to utilize the ninth set of encoding/decoding settings to set the encoder 132.

In Step 1106, the encoder 132 encodes the data according to the encoding/decoding setting determined by the microprocessor 112, to generate an encoded data, wherein if the encoder 132 has the first set of encoding/decoding settings, the encoded data generated by encoding the 4 KB data through the encoder 132 includes the 4 KB data and the 306 bytes ECC; and if the encoder 132 has the ninth set of encoding/decoding settings, the encoded data generated by encoding the 2 KB data through the encoder 132 includes the 2 KB data and the 150 bytes ECC.

In Step 1108, the flash memory controller 110 writes the encoded data into the block selected in Step 1102 in the flash memory module 120.

Figure 12:
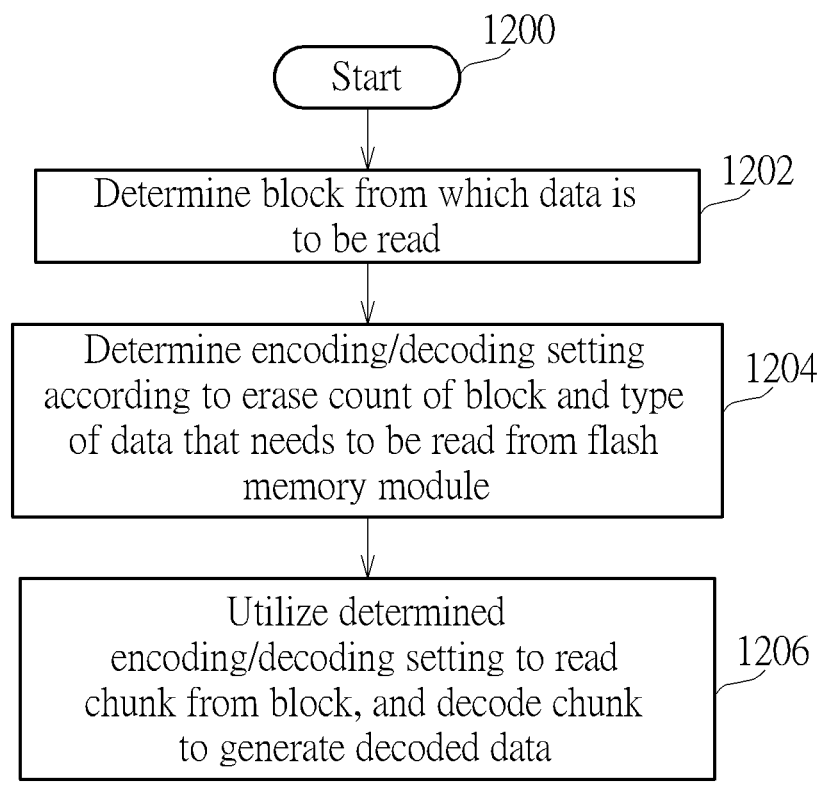
FIG. 12 is a flow chart of reading data from the flash memory module according to an embodiment of the present invention.

FIG. 12 is a flow chart of reading data from the flash memory module 120 according to an embodiment of the present invention.

In Step 1200, the flow starts, and the memory device 100 is powered on and an initialization operation is completed.

In Step 1202, the microprocessor 112 determines a block from which data is to be read.

In Step 1204, the microprocessor 112 determines an encoding/decoding setting according to the erase count of the block and the type of the data that needs to be read from the flash memory module 120 (e.g. the 2 KB data table or the 4 KB general data); or the microprocessor 112 determines an encoding/decoding setting according to the erase count and the type of block and the type of data that needs to be read from the flash memory module 120.

In Step 1206, the decoder 134 generates a decoded data by decoding a chunk read from the block according to the encoding/decoding setting determined by the microprocessor 112, wherein the contents included in a chunk is the encoded data written into the flash memory module 120 in Step 1108 of FIG. 11. For example, if the decoder 134 has the first set of encoding/decoding settings, the decoder 134 reads the chunk that includes the 4 KB data and the 306 bytes ECC from the block for decoding. If the decoder 134 has the ninth set of encoding/decoding settings, the decoder 134 reads the chunk that includes the 2 KB data and the 150 bytes ECC from the block for decoding.

In summary, the method for accessing a flash memory module of the present invention generates an encoded data with a suitable size by setting the encoder according to the type of data to be written and/or the erase count and type of the block that needs to be written. In this way, the subsequent reading of data from the flash memory module can be faster, which improves the overall efficiency of the memory device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for accessing a flash memory module, comprising:
    selecting a block in the flash memory module;
    selecting a specific encoding/decoding setting from a plurality of sets of encoding/decoding settings according to a highest erase count among all blocks in the flash memory module recorded in a block erase count data table, wherein the plurality of sets of encoding/decoding settings comprise different error correction code (ECC) lengths, respectively;
    utilizing the specific encoding/decoding setting to encode a data to generate an encoded data;
    writing the encoded data into the blocks;
    after the encoded data is written into the block:
        receiving a read command for reading a chunk from the flash memory module, wherein the chunk comprises the encoded data;
        selecting the specific encoding/decoding setting from the plurality of sets of encoding/decoding settings;
        utilizing the specific encoding/decoding setting to read the chunk from the flash memory module; and
        decoding the chunk to generate a decoded data.

2. The method of claim 1, wherein the plurality of sets of encoding/decoding settings comprise multiple erase count ranges and corresponding ECC lengths, respectively, and the step of selecting the specific encoding/decoding setting from the plurality of sets of encoding/decoding settings according to the highest erase count among all blocks in the flash memory module recorded in the block erase count data table comprises:
    determining in which of the multiple erase count ranges the erase count of the block highest erase count is located to determine the specific encoding/decoding setting.

3. The method of claim 2, wherein the plurality of sets of encoding/decoding settings comprise a first set of encoding/decoding settings and a second set of encoding/decoding settings, the first set of encoding/decoding settings corresponds to a first erase count range and a first ECC length, the second set of encoding/decoding settings corresponds to a second erase count range and a second ECC length, values in the first erase count range are smaller than values in the second erase count range, the first ECC length is smaller than the second ECC length, and the step of determining in which of the multiple erase count ranges the highest erase count is located to determine the specific encoding/decoding setting comprises:
in response to the highest erase count being located in the first erase count range, selecting the first set of encoding/decoding settings as the specific encoding/decoding setting; and
in response to the highest erase count being located in the second erase count range, selecting the second set of encoding/decoding settings as the specific encoding/decoding setting.

4. The method of claim 1, further comprising:
directly utilizing the specific encoding/decoding setting to encode each write command of subsequent multiple write commands without further selecting one of the plurality of sets of encoding/decoding settings according to erase counts of blocks to be written of said each write command, until the highest erase count recorded in the block erase count data table changes.

5. A flash memory controller, wherein the flash memory controller is arranged to access a flash memory module, and the flash memory controller comprises:
a read only memory, arranged to store a program code;
a microprocessor, arranged to execute the program code to control access of the flash memory module; and
an encoder and a decoder;
wherein:
the microprocessor is further arranged to:
select a block in the flash memory module, and
select a specific encoding/decoding setting from a plurality of sets of encoding/decoding settings according to a highest erase count among all blocks in the flash memory module recorded in a block erase count data table;
the plurality of sets of encoding/decoding settings comprise different error correction code (ECC) lengths, respectively; and
the encoder is arranged to:
utilize the specific encoding/decoding setting to encode a data to generate an encoded data, and
write the encoded data into the block;
wherein after the encoded data is written into the block:
the microprocessor is further arranged to:
receive a read command for reading a chunk from the flash memory module, wherein the chunk comprises the encoded data, and
select the specific encoding/decoding setting from the plurality of sets of encoding/decoding settings; and
the decoder is arranged to:
utilize the specific encoding/setting to read the chunk from the flash memory module, and
decode the chunk to generate a decoded data.

6. The flash memory controller of claim 5, the plurality of sets of encoding/decoding settings comprise multiple erase count ranges and corresponding ECC lengths, respectively, and the microprocessor is further arranged to determine in which of the multiple erase count ranges the highest erase count is located to determine the specific encoding/decoding setting.

7. The flash memory controller of claim 6, wherein the plurality of sets of encoding/decoding settings comprise a first set of encoding/decoding settings and a second set of encoding/decoding settings, the first set of encoding/decoding settings corresponds to a first erase count range and a first ECC length, the second set of encoding/decoding settings corresponds to a second erase count range and a second ECC length, values in the first erase count range are smaller than values in the second erase count range, and the first ECC length is smaller than the second ECC length; in response to the highest erase count being located in the first erase count range, the microprocessor is further arranged to select the first set of encoding/decoding settings as the specific encoding/decoding setting; and in response to the highest erase count being located in the second erase count range, the microprocessor is further arranged to select the second set of encoding/decoding settings as the specific encoding/decoding setting.

8. A memory device, comprising:
a flash memory module; and
a flash memory controller, arranged to access the flash memory module;
wherein the flash memory controller is further arranged to:
select a block in the flash memory module;
select a specific encoding/decoding setting from a plurality of sets of encoding/decoding settings according to a highest erase count among all blocks in the flash memory module recorded in a block erase count data table, wherein the plurality of sets of encoding/decoding settings comprise different error correction code (ECC) lengths, respectively;
utilize the specific encoding/decoding setting to encode a data to generate an encoded data;
write the encoded data into the block; and
after the encoded data is written into the block:
receive a read command for reading a chunk from the flash memory module, wherein the chunk comprises the encoded data;
select the specific encoding/decoding setting from the plurality of sets of encoding/decoding settings; and
utilize the specific encoding/decoding setting to read the chunk from the flash memory module; and
decode the chunk to generate a decoded data.

9. The memory device of claim 8, wherein the plurality of sets of encoding/decoding settings comprise multiple erase count ranges and corresponding ECC lengths, respectively, and the flash memory controller is further arranged to determine in which of the multiple erase count ranges the highest erase count located, to determine the specific encoding/decoding setting.

10. The memory device of claim 9, wherein the plurality of sets of encoding/decoding settings comprise a first set of encoding/decoding settings and a second set of encoding/decoding settings, the first set of encoding/decoding settings corresponds to a first erase count range and a first ECC length, the second set of encoding/decoding settings corresponds to a second erase count range and a second ECC length, values in the first erase count range are smaller than values in the second erase count range, and the first ECC length is smaller than the second ECC length; in response to the highest erase count being located in the first erase count range, the flash memory controller is further arranged to select the first set of encoding/decoding settings as the specific encoding/decoding setting; and in response to the highest erase count being located in the second erase count range, the flash memory controller is further adapted to select the second set of encoding/decoding settings as the specific encoding/decoding setting.

* * * * *